United States Patent [19]
Alexander et al.

[11] 3,883,937
[45] May 20, 1975

[54] METHOD OF FABRICATING A MICROMINIATURE ELECTRONIC TRIMMER CAPACITOR

[75] Inventors: Dale Bruce Alexander, Richardson; James Hayden Johnstone, Dallas, both of Tex.

[73] Assignee: Texas Instruments Incorporated, Dallas, Tex.

[22] Filed: Sept. 3, 1974

[21] Appl. No.: 502,312

[52] U.S. Cl. ......... 29/25.42; 29/25.41; 317/249 D; 317/253
[51] Int. Cl. ............................................ H01g 13/00
[58] Field of Search ................... 29/25.42, 25.41; 317/249 D, 253, 254, 261

[56] References Cited
UNITED STATES PATENTS
3,209,219  9/1965  Masui .................................. 317/253
3,681,664  8/1972  Metzger ............................. 29/25.42

Primary Examiner—Carl E. Hall
Attorney, Agent, or Firm—Harold Levine; Edward J. Connors, Jr.; Stephen S. Sadacca

[57] ABSTRACT

A microminiature electronic trimmer capacitor is comprised of two ceramic discs fastened together by a shaft with a head on one end and a tensioning and fastening device at the other end. The ceramic discs are essentially identical, one being utilized as the rotor and the other being utilized as the stator. The rotor electrode is applied to the ceramic disc after the rotor is fired and lapped. The stator is formed by affixing onto one of its flat surfaces a pair of shaped metal pieces.

8 Claims, 4 Drawing Figures

METHOD OF FABRICATING A MICROMINIATURE ELECTRONIC TRIMMER CAPACITOR

This invention relates to electronic capacitors and more particularly to variable microminiature electronic trimmer capacitors.

Variable electronic trimmer capacitors are utilized to finely tune electronic circuits. With the reduction in size of electronic circuitry, smaller microminiature electronic trimmer capacitors are required such as that utilized in an electronic wrist watch. In a prior art variable miniature electronic trimmer capacitor, the rotor construction is by means of stacking sheets of green ceramic tape, one of which has been metallized by screen printing with conductive ink. The stack is then compressed, die cut and fired at a very high temperature. After firing, the rotor must be lapped in order to control the dielectric thickness and provide a smooth flat surface. During the lapping process, it is sometimes found that as a result of firing the ceramic/electrode/-dielectric sandwich has warped so much that before the dielectric is lapped flat, the electrode is exposed. Since an exposed electrode will short circuit the capacitor, these parts are scrapped. Also, the finished thickness of the dielectric is neither constant from part to part nor is it constant within a single part.

It is therefore an object of the present invention to provide a method of manufacturing an improved variable microminiature electronic trimmer capacitor and the article of manufacture.

It is another object of the invention to provide a method of manufacturing a variable microminiature electronic trimmer capacitor in which the dielectric thickness is relatively constant from part to part and constant within a single part and the article of manufacture.

It is a further object of the invention to provide an improved and more efficient method of manufacturing variable microminiature electronic trimmer capacitors.

An advantage of the present invention is that an improved, more reliable variable microminiature electronic trimmer capacitor is produced at a reduced cost.

Another advantage of the present invention is the use of essentially identical rotor and stator ceramic substrates which eliminate piece parts.

A further advantage of the invention is that the rotor electrode is always parallel and flat since such electrode is applied after the rotor has been lapped flat.

Still another advantage of the invention is that the dielectric thickness is controlled by plating thickness which eliminates the need for lapping the dielectric to correct thickness which is the most costly and lowest yield operation in prior art manufacturing of miniature electronic trimmer capacitors.

A still further advantage of the invention is that the plating process is performed at a relatively low temperature so that the rotor substrate is not subject to warpage and the flatness is maintained.

Another advantage of the invention is that the metallization of the rotor substrate extends inside the center hole of such substrate thereby assuring electrical contact with the rivet and a process step is eliminated.

A still further advantage of the invention is that the total device thickness can be controlled to close tolerances thereby simplifying requirements on the retainer spring.

These and other objects and advantages are provided by the present invention in which a variable microminiature electronic trimmer capacitor is comprised of two ceramic discs movably held together with a shaft having an adjusting head on one end and a biasing and fastening device at the other. The two ceramic discs, one being utilized for the rotor substrate and the other being utilized for the stator substrate, are essentially identical. The rotor electrode is applied after the ceramic rotor disc is fired and lapped. The stator is formed by affixing a pair of shaped metal pieces on one flat surface of the ceramic stator substrate. The outside surfaces of the metal pieces are then machine lapped flat to provide the stator electrode and lead. The rotor is provided by firing the stator ceramic disc without an electrode thereon, lapping the ceramic disc flat on one side and then forming a layer of metal on the lapped surface to form the electrode. One preferred technique of forming the thin metal layer is by ion plating deposition techniques. The deposited layer of metal preferably extends down the sidewalls of the rotor substrate center hole to make positive electrical contact with the shaft. A thin layer of dielectric material is then deposited on the top of the disc covering only the electrode side and not extending into the center hole.

A feature of the above-described method of fabricating a microminiature electronic trimmer capacitor and the resulting article of manufacture is that the same ceramic discs can be utilized in the formation of both the stator and rotor. Another feature of the invention is that the metal stator electrode is affixed by cement, for example, to the stator ceramic disc and then lapped to flatness.

A further feature of the invention is that the rotor ceramic disc is lapped to flatness prior to plating thereby eliminating lapping to thickness after plating. Still another feature of the invention is that the rotor electrode is plated on and the dielectric plated over the electrode providing coatings of uniform thickness which require no further lapping to achieve the desired rotor-stator mating characteristics.

Still a further feature of the invention is that the metallization of the rotor electrode automatically includes a hole through which the shaft rivet passes.

Still further features and advantages of the invention will become apparent from the detailed description and claims when read in conjunction with the appended drawings wherein:

Figure 1:
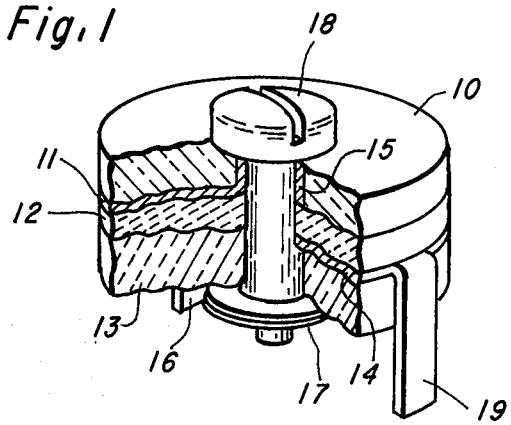
FIG. 1 is a sectioned view of the completed trimmer capacitor.
Figure 3:
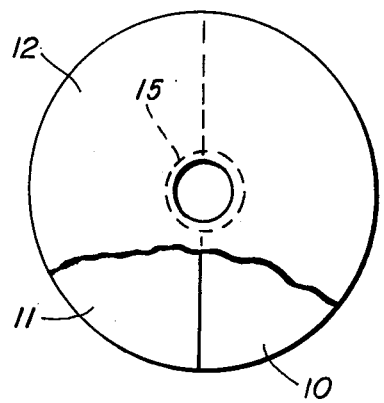
FIG. 3 is a top view of the rotor substrate.

Referring to the drawings, in which common reference numerals are utilized, an embodiment of a microminiature electronic trimmer capacitor in accordance with the present invention is shown. The variable trimmer capacitor is comprised of two cylindrical ceramic substrates 10 and 13 which are disc-shaped, approximately 210 mils in diameter and 60–70 mils in thickness, and essentially identical. Each substrate 10 and 13 has an opening in the center thereof to accept a rivet member 18. The rotor substrate 10 includes an electrode 11 and a dielectric film 12. The rotor is formed in the following manner. The ceramic rotor substrate 10 is fired and then lapped flat on one face thereof. Then, a thin layer, between approximately 0.01 to 1 mil, of metal such as nickel or copper is deposited on the lapped surface to form the semicircular electrode 11. In a preferred embodiment of the method of the invention, ion plating techniques are utilized to form the metal electrode so that the metal can extend down the sidewalls of the substrate center opening 15. Ion plating techniques are described, for example, in Research/Development, July 1973, Vol. 24, No. 7, pp. 43–44, 46.

After the electrode is formed, it is flat and uniform. Since the substrate has already been fired, before lapping, the rotor substrate will remain flat and unwarped and the electrode will remain uniform. Next, a thin layer of a high constant dielectric material, such as barium titanate, is deposited on top of the disc 10 to a thickness of about between 0.1–0.5 mils covering the electrode face and not extending into the center hole 15. In a preferred embodiment of the method of the invention, ion plating techniques are utilized to form the dielectric layer 12. The capacitance may be varied by controlling the thickness of the dielectric thus deposited from approximately 1 or 2 picofarads - 75 picofarads with each finished capacitor being linearly variable over 20–25 picofarads within that range. Thus, a capacitor may be variable over a range from 5–30 picofarads, 25–50 picofarads, 35–60 picofarads, 50–75 picofarads, etc. with adjustment provided by the position of the rotor relative to the stator as controlled by the adjusting head of the rivet. The interface between the rotor dielectric 12 and stator electrode 14 is lubricated with a lubricating oil having a dielectric constant on the order of 2.5 to increase the total capacitance.

Figure 2:
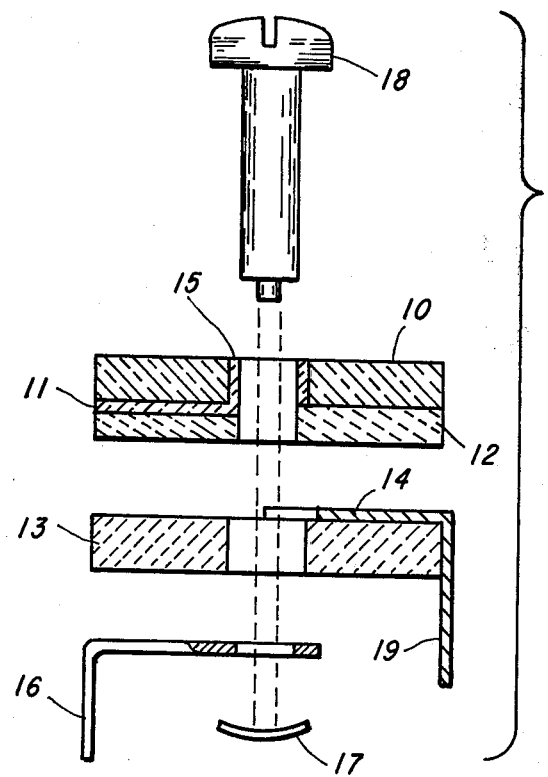
FIG. 2 is an exploded cross-sectional view of an embodiment of a variable microminiature electronic trimmer capacitor in accordance with the present invention.
Figure 4:
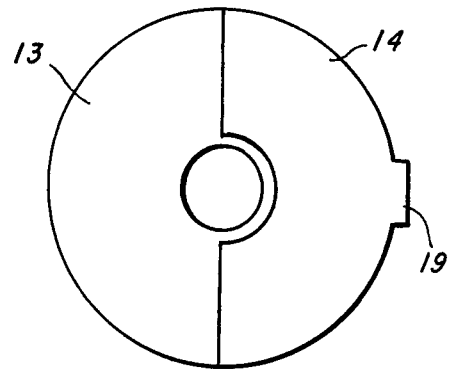
FIG. 4 is a top view of the stator substrate.

The stator is formed by utilizing a ceramic disc 13 essentially identical to the ceramic disc 10 upon which a semicircular metal electrode 14 has been affixed. The electrode 14 is comprised of a metal such as tin plated copper, brilliant copper, phosphor bronze or other readily solderable metal and includes a terminal member 19. The electrode 14 may be affixed to the stator substrate 13 by an adhesive cement such as an epoxy cement. The substrates are then put together as shown in FIGS. 1 and 2 by a metal spring washer 17 and the metal rivet 18 which includes an adjusting head for controlling the rotor position relative to the stator and thereby providing means for varying the capacitance as indicated above. The rivet is pressure fitted to the metallization formed in the opening 15 of the rotor substrate 10 thereby carrying the rotor substrates but movable within the opening in the stator substrate 13. A terminal member 16 is sandwiched with the ceramic discs 11 and 13 making contact with the spring washer and rivet and thereby with the electrode 11 to provide an external terminal for the rotor.

Since it is obvious that many changes and modifications can be made in the above-described details without departing from the nature and spirit of the invention, it is understood that the invention is not to be limited to said details except as set forth in the appended claims.

What is claimed is:

1. A method of fabricating a variable microminiature capacitor comprising the steps of:
    a. providing two similar disc-shaped non-conductive substrates each having a center opening therein;
    b. firing one of said substrates;
    c. lapping flat one major surface of said one substrate;
    d. depositing a metal coating on a portion of said one major surface of said one substrate and extending into a portion of the center opening thereof, the metal coating on said one major surface forming a rotor electrode;
    e. forming a layer of dielectric material on said one major surface of said one substrate completely covering the deposited metal electrode and the remaining portion of said one major surface;
    f. affixing a metal stator electrode to one major surface of the other substrate;
    g. sandwiching said first and second substrates together with said layer of dielectric material and said stator electrode forming an interface therebetween; and
    h. inserting a shaft member having an adjusting head on one end thereof through the center openings in said substrates, said shaft member making positive electrical and mechanical contact with the metal extending into the center opening of said one substrate and freely movable within the opening in said second substrate.

2. The method according to claim 1 including the step of applying a lubricating oil having a relatively high dielectric constant in said interface.

3. The method according to claim 1 wherein said substrates are comprised of a ceramic material.

4. The method according to claim 1 wherein the metal rotor electrode is deposited to a thickness of between about 0.01 and 1 mil.

5. the method according to claim 1 wherein the metal rotor electrode is deposited by ion plating of said metal.

6. The method according to claim 1 wherein said dielectric material is formed to a thickness between about 0.1 – 0.5 mils.

7. The method according to claim 1 including the step of attaching a spring washer to the end of said shaft opposite said adjusting head to bias said sandwiched substrates.

8. The method according to claim 1 wherein said dielectric material is deposited by ion plating of said dielectric material.

* * * * *